US005148158A

United States Patent [19]

Shah

[11] Patent Number: 5,148,158

[45] Date of Patent: Sep. 15, 1992

[54] EMERGENCY LIGHTING UNIT HAVING REMOTE TEST CAPABILITY

[75] Inventor: Nikunj Shah, Hoffman Estates, Ill.

[73] Assignee: Teledyne Industries, Inc., Los Angeles, Calif.

[21] Appl. No.: 467,349

[22] Filed: Jan. 22, 1990

Related U.S. Application Data

[63] Continuation of Ser. No. 172,551, Mar. 24, 1988, abandoned.

[51] Int. Cl.[5] ...................... G08C 17/00; G08B 29/00; H02J 9/00; H02J 7/00

[52] U.S. Cl. ................................ 340/825.17; 315/86; 340/515; 340/527; 340/641; 340/825.69; 340/825.72

[58] Field of Search ................ 307/80, 115, 116, 140, 307/117, 126, 66; 315/86-88; 324/414, 418; 340/825.16, 825.17, 825.69, 825.72, 514, 636, 642

[56] References Cited

U.S. PATENT DOCUMENTS

| | | | |
|---|---|---|---|
| 1,530,856 | 3/1920 | Schmidt . | |
| 2,881,409 | 4/1959 | Cook et al. . | |
| 3,014,199 | 12/1961 | Dill et al. . | |
| 3,040,243 | 6/1962 | Weiss | 324/20 |
| 3,061,691 | 10/1962 | Semon . | |
| 3,210,726 | 10/1965 | Copsy . | |
| 3,233,217 | 2/1966 | Bost . | |
| 3,293,600 | 12/1966 | Gifft . | |
| 3,294,901 | 12/1966 | Stanghi | 178/6 |
| 3,435,444 | 5/1969 | Kuhn . | |
| 3,537,089 | 10/1970 | Lee . | |
| 3,594,751 | 7/1971 | Ogden et al. . | |
| 3,636,514 | 1/1972 | Burgess . | |
| 3,771,012 | 11/1973 | Niederjohn | 315/86 |
| 3,819,980 | 6/1974 | Mullersman | 315/86 |
| 3,833,895 | 9/1974 | Fecteau . | |
| 3,840,801 | 10/1974 | Kellogg et al. | 324/21 |
| 3,842,343 | 10/1974 | Taylor et al. | 324/21 |
| 3,916,212 | 10/1975 | Prochazka et al. | 307/66 |
| 3,939,398 | 2/1976 | Kellogg | 324/21 |
| 3,952,229 | 4/1976 | Rekow | 315/131 |
| 3,967,192 | 6/1976 | Kellogg et al. | 324/21 |
| 4,019,128 | 4/1977 | Chebowski | 324/21 |
| 4,030,013 | 6/1977 | Watrous | 320/59 |
| 4,067,000 | 1/1978 | Carlson | 340/636 |
| 4,071,749 | 1/1978 | Balosh | 307/66 |
| 4,095,212 | 6/1978 | Pruitt | 325/520 |
| 4,143,368 | 3/1979 | Route et al. | 340/543 |
| 4,232,308 | 11/1980 | Lee et al. | 340/539 |
| 4,258,291 | 3/1981 | Scott et al. | 315/156 |
| 4,283,657 | 8/1981 | Gordon et al. | 315/86 |
| 4,313,110 | 1/1982 | Subulak et al. | 340/527 |
| 4,323,820 | 4/1982 | Teich | 315/86 |
| 4,417,235 | 11/1983 | Del Grande . | |
| 4,451,762 | 5/1984 | Forte et al. | 315/87 |
| 4,463,339 | 7/1984 | Frick et al. | 340/642 |
| 4,554,533 | 11/1985 | Bosnak | 340/514 |
| 4,603,325 | 7/1986 | Marino et al. | 340/539 |
| 4,682,078 | 7/1987 | Pascalide | 307/66 |
| 4,693,110 | 9/1987 | Juengel | 73/1 |
| 4,827,244 | 5/1989 | Bellavia et al. | 340/514 |
| 4,894,601 | 1/1990 | Watkins | 307/66 |
| 4,945,280 | 7/1990 | Beghelli | 340/825.17 |

*Primary Examiner*—Donald J. Yusko
*Assistant Examiner*—John Giust
*Attorney, Agent, or Firm*—Lockwood, Alex, FitzGibbon & Cummings

[57] ABSTRACT

An emergency lighting system includes a lighting unit having a battery which is kept in a charged condition in the presence of voltage on a power line to which the unit in connected. Upon loss of voltage, the battery is caused to discharge into a pair of flood lamps to provide emergency illumination to an area surrounding the unit. To provide for periodic testing of the unit without requiring the user to actuate a switch on the unit the system includes a radio frequency receiver in the unit which responds to signals generated by a hand-held radio frequency transmitter actuated by the user. A two stage battery charging circuit and a low voltage lamp cut-off circuit are included in the lighting unit for improved battery life.

1 Claim, 3 Drawing Sheets

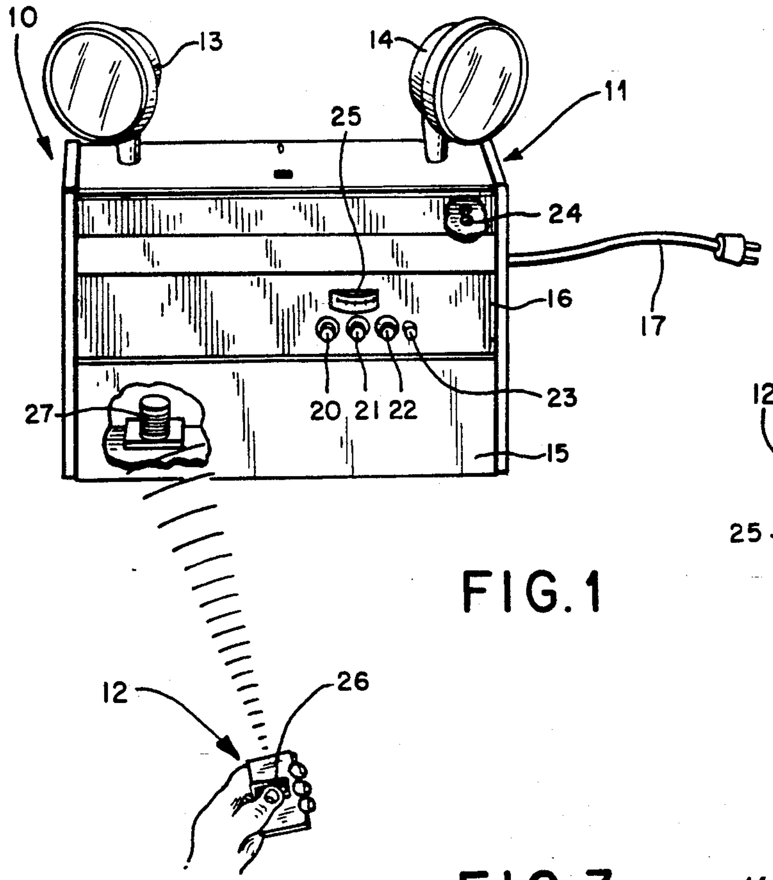
FIG. 1
FIG. 2
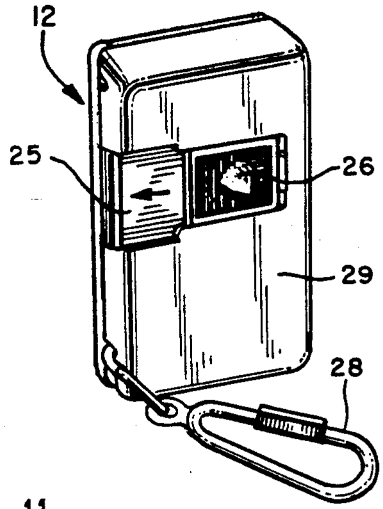
FIG. 3
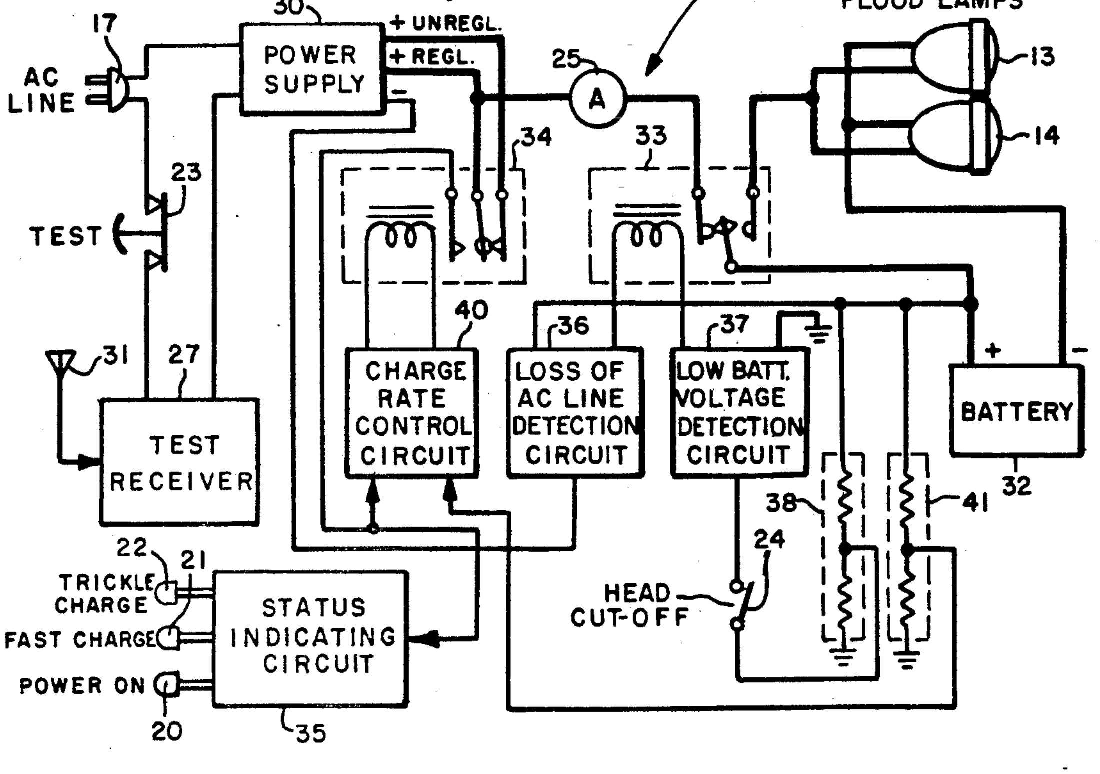

EMERGENCY LIGHTING UNIT HAVING REMOTE TEST CAPABILITY

This application is a continuation, of application Ser. No. 172,551, filed Mar. 24, 1988 now abandoned.

BACKGROUND OF THE INVENTION

The present invention relates to emergency lighting systems, and more particularly to an emergency lighting unit having a remote test feature and improved circuitry for prolonging battery life.

Emergency lighting units have come into wide use for providing emergency lighting to commercial and residential buildings in the event of AC line failure Typically, such units are mounted high on the wall of a hall or stairway, and are connected to the AC line supplying lighting in that hall or stairway so as to provide lighting to the area upon loss of power. Examples of such units in commercial use are shown in the model TC6L lead acid battery and model TC6N and A6N nickel cadmium emergency lighting units manufactured by Teledyne Big Beam of Crystal Lake, Ill. Such units are available with a variety of different lighting heads to accommodate different lighting requirements, as well as with a variety of different battery voltages and capacities to accommodate different lighting requirements.

To be certain that emergency lighting units are providing the desired degree of protection it is desirable that they be periodically tested, and in many installations such tests are established as a regular procedure. Unfortunately, to test prior emergency lighting units it was necessary for the user to individually actuate a test button on each unit housing to momentarily interrupt the AC line, and then observe after a short time delay the illumination of the unit flood lights. Since the housings of such units were often located in high relatively inaccessible locations, testing was often been an arduous, time-consuming task, particularly where a large number of emergency lighting units had to be tested.

Accordingly, the need has existed for an emergency lighting unit which can be quickly and economically tested, without the need to gain access to the unit housing. The present invention satisfies this requirement through the provision of a radio frequency test link, actuated by a small hand-held battery-operated radio transmitter.

A further requirement of emergency lighting units is that the unit provide a long shelf life prior to actual use, and a long period of illumination when called into use. The present invention meets this requirement through the provision of a variable-rate battery charging circuit which maintains the battery in an optimum state of charge, and a low-voltage cut-out circuit which prevents excessive discharge of the battery when the lighting unit is called into use.

SUMMARY OF THE INVENTION

An emergency lighting system operable upon loss of voltage on a monitored AC line includes an illumination head comprising at least one flood lamp, a rechargeable battery for powering the flood lamp, switch means for connecting the battery to the flood lamp upon loss of voltage on the monitored conductor, test circuit means including a receiver operable to activate the switch means, and remote transmitter means for actuating the receiver means to activate the test function.

The invention is further directed to an emergency lighting unit operable upon loss of voltage on monitored AC line, which includes at least one flood lamp, battery means for powering the flood lamp, and switch means for connecting the battery to the flood lamp upon loss of voltage on the monitored conductor. The unit further includes battery charging mean for supplying current to the battery, the charging means having a first operating mode wherein a generally constant current is supplied to the battery, and a second operating mode wherein a progressively decreasing charging current at a constant voltage is supplied to the battery, the charging means operating in the second mode upon the voltage across the battery reaching a predetermined threshold level.

The invention is further directed to an emergency lighting unit operable upon loss of voltage on a monitored AC line, which includes at least one flood lamp, battery means for powering the flood lamp, and switch means for connecting the batery means to the flood lamp upon loss of voltage on the monitored conductor. User-actuable head cut-off means are provided for interrupting the connection between the battery and the flood lamp upon the voltage across the battery falling below a predetermined minimum threshold level.

BRIEF DESCRIPTION OF THE DRAWINGS

The features of the present invention which are believed to be novel are set forth with particularity in the appended claims The invention, together with the further objects and advantages thereof, may best be understood by reference to the following description taken in conjunction with the accompanying drawings, in the several figures of which like reference numerals identify like elements, and in which:

FIG. 1 is a perspective view of an emergency lighting system constructed in accordance with the invention showing a wall-mounted emergency lighting unit and a hand-held transmitter for initiating testing of the system.

FIG. 2 is a perspective view of the hand-held transmitter utilized in the system of the FIG. 1.

FIG. 3 is a simplified functional block diagram of the emergency lighting unit shown in FIG. 1.

DESCRIPTION OF THE PREFERRED EMBODIMENT

Figure 4:
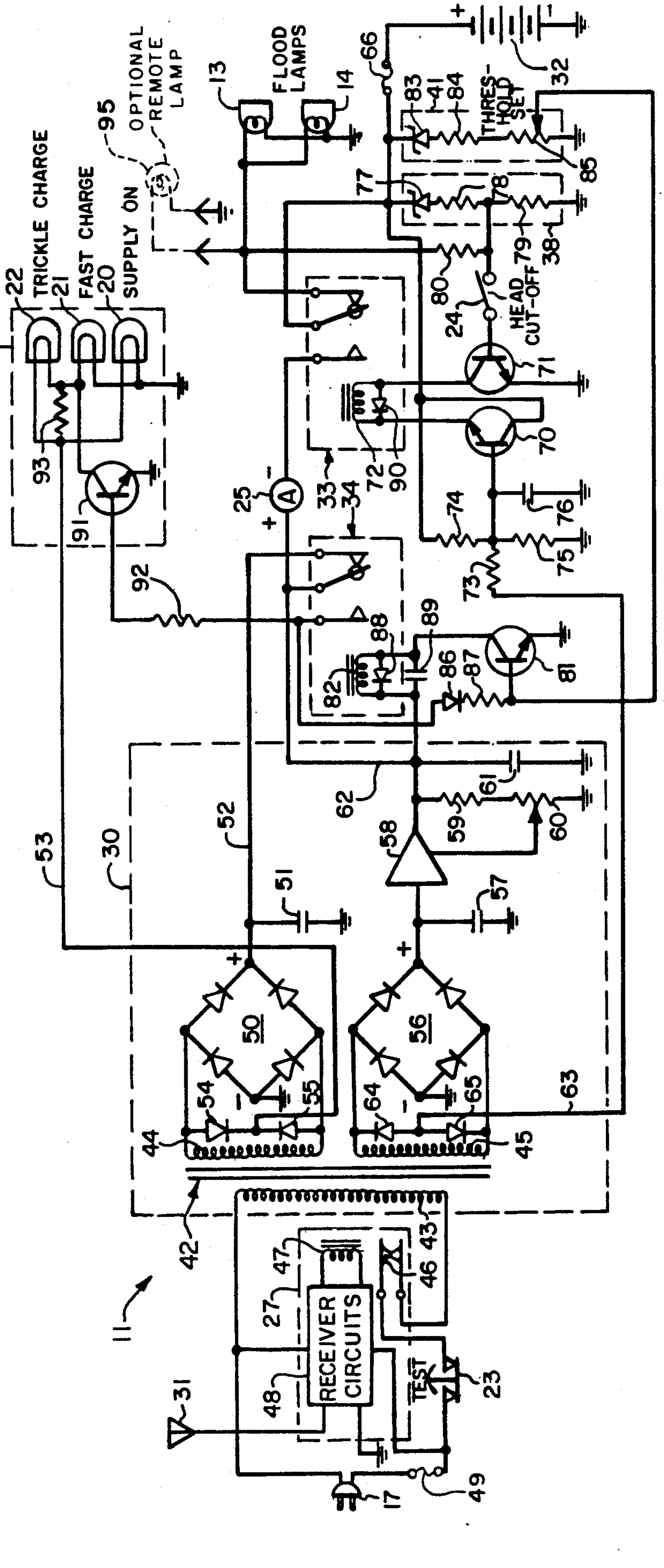
FIG. 4 is a simplified electrical schematic diagram of the emergency lighting unit of FIGS. 1–4.

Referring the the figures, and particularly to FIG. 1, an emergency lighting system 10 incorporating the features of the present invention is seen to include a wall-mounted lighting unit 11 and, in accordance with one aspect of the invention, a remote hand-held battery-operated transmitter unit 12 by means of which the lighting unit can be tested from a remote location, without user access to the unit. As shown, the remote transmitter unit 12 is intended for hand-held use and is operated by the user at a remote location some distance from the wall-mounted lighting unit 11.

In accordance with conventional practice, lighting unit 11 includes a lighting head assembly consisting of a pair of low-voltage flood lamp assemblies 13 and 14. The assemblies, which may be conventional in construction, are pivotally and swivelably mounted on the top surface of a housing 15, and are adjustable so that the emergency lighting provided by these assemblies can be directed as required. Housing 15 includes on its front panel a control panel 16 containing various indicator lamps and switches associated with operation of the lighting unit. In particular, control panel 16 may include an amber POWER ON indicator lamp 20, a red FAST CHARGE indicator lamp 21 and a green TRICKLE CHARGE indicator lamp 22. Panel 16 may further include a momentary contact test switch 23 and a head cut-off switch 24 for removing power to flood lamp assemblies 13 and 14 in the event that AC line power has failed and emergency illumination is no longer required. Test switch 23 functions to initate a test of the emergency lighting unit by simulating the interruption of AC line power to the unit. A volt meter 25 may be provided on control panel 16 to indicate battery condition to the user.

The emergency lighting unit 11 is connected to an AC line by a power cord 17, although in practice this connection may be established instead by hard-wiring of the unit directly to the AC line.

Referring to FIG. 2, the hand-held test-initating transmitter unit 12 is seen to include a slidable cover 25 which can be slided by the user to expose an actuator button 26 by which the user can initate a radio frequency transmission to emergency lighting unit 11. Transmitter unit 12 may be entirely conventional in design and construction, and may employ conventional oscillator, amplifier and modulating circuitry to provide an encoded radio frequency signal to the emergency lighting unit. Within the lighting unit, a radio frequency receiver 27 (FIG. 1) of conventional design and construction and capable of receiving and responding to the signal transmitted by transmitter unit 12 is provided. For ease in carrying transmitter 12, a key ring type chain device 28 may be provided in conjunction with an impact resistant plastic housing 29 of conventional construction. In practice, housing 29 may be brightly colored to help prevent loss or inadvertent damage of the transmitter unit, and switch 26 may be a momentary contact type switch spring-biased to an off position so that the transmitter cannot be inadvertently left on.

Referring to the simplified functional block diagram of FIG. 3, the emergency lighting unit 11 is seen to include generally a power supply 30 operable from the monitored AC line through the connecting power cord 17. As shown, the AC line connection is completed through test switch 23 and test receiver 27. Thus, the connection can be interrupted by user actuation of test switch 23 on control panel 16, or by user actuation of test receiver 27 by means of the remote test initiating transmitter unit 12. Either action has the effect of removing AC line power to power supply 30 and thereby initating a power loss condition within lighting unit 11. An antenna 31 may be provided in conjunction with remote test receiver 27, either within or external to housing 15.

Power supply 30 provides, in accordance with another aspect of the invention, both unregulated high current and regulated low current outputs. The regulated low current output is connected to a standby battery 32 through the normally open contacts of a lighting control relay 33 and an ammeter 25. The normally open contacts of relay connect battery 32 to flood lamps 13 and 14 of the head assembly, so that upon energization of relay 33 lamps 13 and 14 are illuminated by battery 32.

When relay 33 is deenergized charging current is supplied to battery 32 from the regulated low voltage output of power supply 30. To provide for a higher unregulated current to battery 32 when battery voltage is low, the battery is connected to the high current unregulated output of power supply 30 through the normally-closed contacts of a charge control relay 34. The normally-open contacts of relay 34 are connected to a status indicating circuit 35 which causes an appropriate one of indicator lamps 20–22 on control panel 16 to be illuminated in accordance with the charging mode of the battery.

The operation of relay 33 is controlled by a loss of AC line detection circuit 36 which monitors a separate isolated output of power supply 30 and applies battery voltage to relay 33 upon loss of the isolated output. Relay 33 is further controlled by a low battery voltage detection circuit 37 which monitors the terminal voltage of battery 32 by means of a voltage divider network 38 and interrupts the ground return of the relay upon the terminal voltage of the battery falling below a predetermined minimum threshold level. Head cut-off switch 24 is provided in this circuit, in accordance with another aspect of the invention, to enable a user to interrupt operation of flood lamps 13 and 14 if desired. Thus, relay 33 is energized and the flood lamps are illuminated by battery 32 upon loss of AC line voltage by detection circuit 36, and remain illuminated during such voltage loss until the terminal voltage of battery 32 as detected by detection circuit 37 results in relay 33 being deenergized.

The operation of the charge control relay 34 is controlled by a charge rate control circuit 40 which initiates a low charge rate upon the battery terminal voltage as sensed by a voltage divider 41 rising above a predetermined maximum threshold level. At this time, the connection to the high current unregulated output of power supply 30 is interrupted and charging continues at the relatively lower charging rate provided by the voltage regulated output of the power supply. A connection to the normally-open contact of relay 34 provides a hysteresis or latching function to the action of charge control circuit 40 so that the relay will remain in the low current regulated mode once battery voltage has exceeded the predetermined maximum threshold, notwithstanding line voltage variations.

Referring to the simplified electrical schematic diagram of FIG. 4, power supply 30 may include a transformer 42 having a primary winding 43 and a pair of secondary windings 44 and 45. AC line power is supplied to primary winding 43 through normally-closed contacts 46 of a relay 47 within test receiver 27, which includes conventional receiver circuitry 48 powered by the AC line. A conventional fuse 49 is provided in series with the line connection to protect the system in the event of a malfunction, and the user-actuated test switch 23 is provided in series with the line to faciliate user testing or simulation of a voltage loss as previously described With this arrangement, upon actuation of test switch 23 or upon receipt of a test signal by receiver circuitry 48, AC line power is removed from primary winding 43.

To provide a relatively high current unregulated source for charging battery 32 secondary winding 44 is connected to the input terminals of a conventional bridge rectifier network 50. The negative polarity output terminal of this network is grounded, and the positive polarity output terminal is connected by a filter capacitor 51 to ground to provide on an output line 52 a source of unregulated charging current. An additional isolated positive polarity output is provided on a line 53 by a pair of diodes 54 and 55 connected back-to-back across secondary winding 44.

A relatively low voltage regulated output is provided by a second full wave rectifier network 56 connected across secondary winding 45. The negative polarity output terminal of this network is grounded and the positive polarity output terminal is connected by a filter capacitor 57 to ground and to the input of a voltage regulator 58. In accordance with conventional practice, a voltage divider comprising a fixed resistor 59 and a variable resistor 60 are connected between the output of the regulator and ground to provide a control voltage for operation of the regulator. A capacitor 61 connected between the regulator output and ground provides additional filtering for the regulated direct current produced by the regulator, which is available on a line 62. An isolated negative polarity output is developed on a line 63 by a pair of diodes 64 and 65 connected back to back across secondary winding 45.

The regulated output of power supply 30 appearing on line 62 is supplied to battery 32 through ammeter 25, the normally-closed contacts of relay 33 and a fuse 66 provided to protect battery 32 in the event of a circuit malfunction. In the event of loss of AC line voltage relay 33 is actuated to cause battery 32 to be connected to the parallel-connected flood lamps 13 and 14. Actuation of relay 33 is accomplished in this event by application of a direct current from battery 32 through NPN transistors 70 and 71 to the winding 72 of relay 33. In the presence of line voltage transistor 70 is biased into cut-off by the negative polarity voltage developed on line 63, which is applied to the base of the transistor through an isolation resistor 73. Upon loss of AC line voltage the negative bias is removed, and a positive bias is applied to the base of the transistor from battery 32 through a voltage divider comprising resistors 74 and 75 to drive the transistor into saturation. A capacitor 76 connected between and base and ground provides a desired time delay to the transition between cut-off and saturated states of transistor 70.

Transistor 71 is normally biased into saturation by a positive polarity voltage developed by battery 32. In particular, this is provided by voltage divider 38 which is seen to comprise a zener diode 77 and a pair of resistors 78 and 79 connected between the positive terminal of the battery and ground. The voltage division provided by voltage divider 38 is such that transistor 71 biased into saturation so long as sufficient voltage remains across the battery to operate flood lamps 13 and 14 without harm to the battery. An additional resistor 80 connected between the flood lamps and the voltage divider modifies the minimum threshold voltage level required to maintain saturation in transistor 71 during operation of the flood lamps by reducing the division factor of the voltage divider, resulting in the application of a greater voltage for a given battery terminal voltage to transistor 71.

The head cut-off switch 24 provided in series with the base of transistor 71 provides an effective low-current point at which the operation of relay 33 ca be interrupted without switching heavy current loads. Actuation of cut-off switch 24 results in relay 33 being deenergized, allowing the user to terminate operation of flood lamps 13 and 14 in the event of an extended power loss where emergency lighting is no longer required. To this end, head cut-off switch 24 may be bi-stable whereby the switch can be actuated by the user to remain in an open state for continued non-operation of the flood lamps.

When relay 34 is not energized the unregulated output of power supply 30 on line 52 is applied to battery 32 through the normally-closed contacts of the relay. However, when the terminal voltage of battery 32 rises to a predetermined threshold voltage, as determined by voltage divider 41, an NPN transistor 81 is caused to conduct and the winding 82 of relay 34 is energized by the voltage regulated output of power supply 30 on line 62. To this end, the voltage divider 41 connected between the positive terminal of battery 32 and ground includes a zener diode 83, a fixed resistor 84 and a potentiometer 85. Depending on the setting of potentiometer 85, a portion of the battery voltage is applied to the base of transistor 81 such that conduction is established through the transistor when the battery voltage has risen above the threshold level. A hysteresis or latching function is provided for this transition by a diode 86 and resistor 87 which apply battery voltage present at the normally-open contact of relay 34 upon energization of the relay. A back-biased diode 88 and capacitor 89 provide transient suppression at relay winding 82, as does a diode 90 connected across winding 72 of relay 33. Thus, upon the voltage across battery 32 rising to the predetermined threshold level, transistor 81 is biased into saturation and winding 82 is energized to cause relay 34 to disconnect the unregulated relatively high voltage high current output on line 52 from the battery.

An indication of the charging mode of the emergency lighting system is provided by indicator lamps 20–22. In particular, the amber indicator lamp 20, indicating the presence of AC voltage, is connected between line 53 and ground and is lighted whenever supply 30 is powered. The operation of the red indicator lamp 21, indicating a fast charge, and the green indicator lamp 22, indicating a trickle charge, is controlled by an NPN transistor 91 having collector and emitter electrodes connected across indicator lamp 21 and its base connected to the normally open contacts of relay 34 by a resistor 92. In the event of a fast charge condition, when relay 34 is not energized, transistor 91 is non-conductive and indicator lamp 21 is illuminated through a series-connected resistor 93 by current on line 53. Since the resistance of lamp 21 is much higher than the resistance of resistor 93, relatively little voltage is developed across the resistor and lamp 22 does not light. However, upon actuation of relay 34 concurrent with a trickle charge condition, transistor 91 is biased into saturation to shunt indicator lamp 21. Indicator lamp 22, which is connected across resistor 21, now receives the voltage present on line 53 and accordingly is caused to illuminate.

Figure 5:
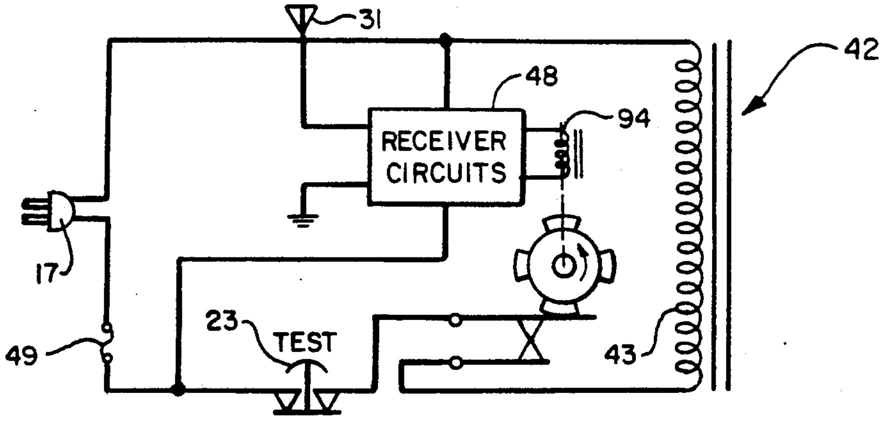
FIG. 5 is a simplified electrical chematic diagram for an alternate remote test circuit for use in the emergency lighting unit of FIGS. 1–4.

As shown in FIG. 5, the remote test function may alternatively be accomplished by utilizing a bi-stable relay 94 energized by receiver circuits 48. With this arrangement, power to the lighting unit is interrupted with alternate actuations of the radio receiver, so that the test function is initiated with a first momentary RF signal and terminated with a second momentary RF signal. In this way, the test function can be actuated as long as desired by the user. This is particularly useful where optional remote flood lamps 95 are used at a location distant from the lighting unit.

Figure 6:
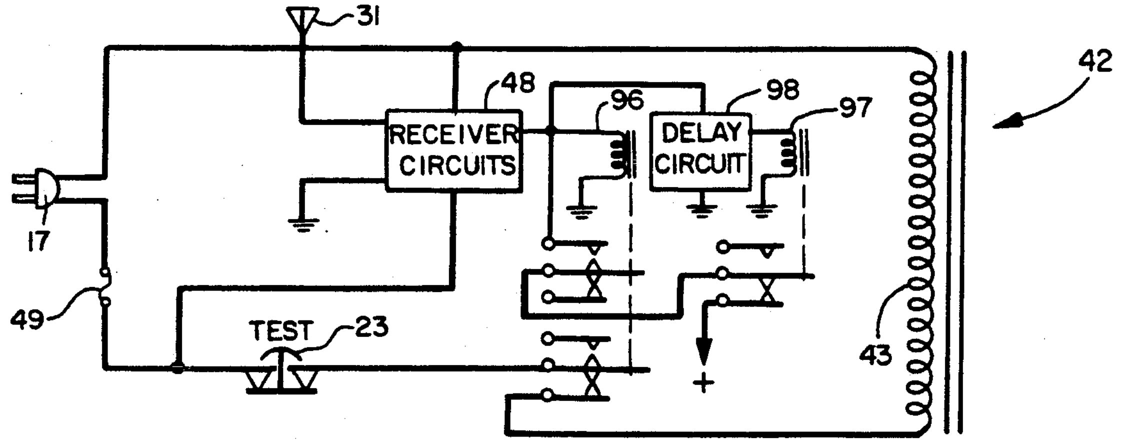
FIG. 6 is a simplified electrical chematic diagram of another alternate circuit for use in the emergency lighting unit of FIGS. 1–4.

As shown in FIG. 6, it is possible to have a test function of fixed duration following a momentary RF signal by utilizing two relays 96 and 97 and a delay circuit 98. Upon receipt of a momentary RF signal receiver circuits 48 actuate relay 96, which thereafter remains actuated by reason of an additional pair of contacts connected in a holding circuit. After a predetermined time period, delay circuit 98 momentarily actuates relay 97, which opens the holding circuit of relay 96 and terminates the test period.

While a radio frequency test link has been shown for remote actuation of the emergency lighting system from a remote location, it will be appreciated that other types of wireless test links can be utilized. For example, it would be possible to subsitute an infrared light transmitter unit for the radio frequency transmitter unit 12 and an infrared receiver for the radio frequency receiver 48 whereby the same test function could be performed by the user within line of-sight of lighting unit 11. In this instance, it is contemplated that an infrared detector would be mounted on housing 15, preferably on the front panel thereof, to provide for reception of the radiated infrared beam.

Also, it is contemplated that an ultrasonic transmitter could be substituted to transmit an ultrasonic sound beam which would be intercepted by a conventional ultrasonic receiver within housing 15 to accomplish the remote test function. In this case, an ultasonic transducer would be mounted on housing 15, preferably on the front panel thereof, to permit a performance of the test function within acoustic range of the emergency lighting unit 11.

Figure 7:
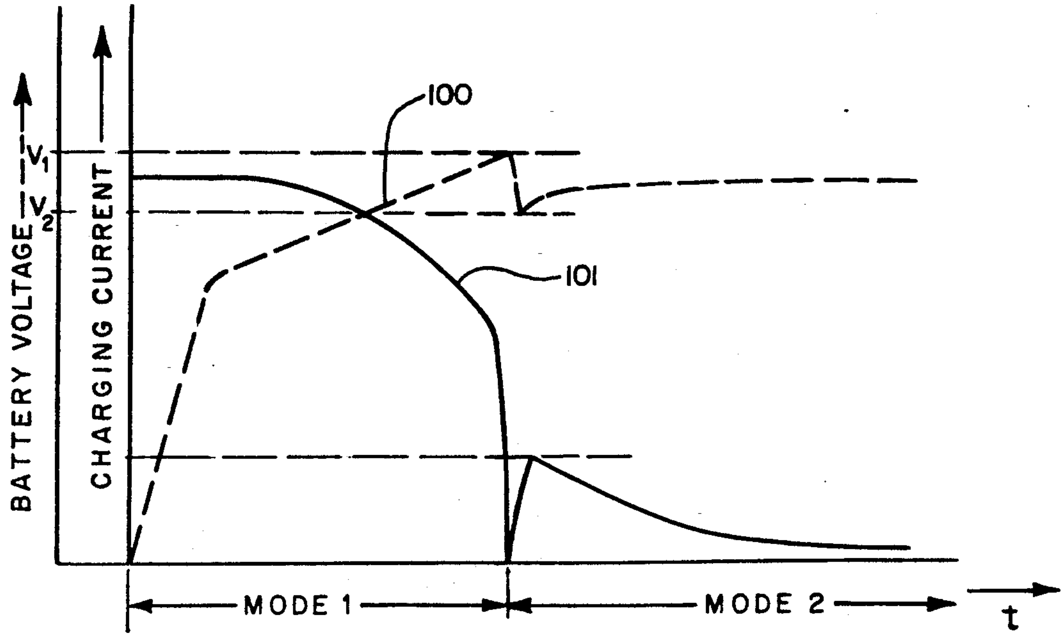
FIG. 7 is a plot of certain current and voltage parameters associated with the emergency lighting unit of FIGS. 1–4.

The dual-mode charging function provided in of emergency lighting unit 11 provides optimum protection for nickel-cadmium and lead acid batteries, which are typically provided in a sealed configuration requiring minimal maintenance on the part of the user. By reason of the relatively high initial charging current such batteries are quickly brought up to a safe charge level following discharge during a voltage loss. However, as the battery terminal voltage reaches a predetermined threshold level at which such charging cannot be continued, a constant-voltage is maintained across the battery terminals whereby a progressively decreasing charge occurs as the battery continues to approach a fully charged condition. This is shown in FIG. 7, wherein, in the high current mode, upon initial power up of the lighting unit the voltage 100 across the battery is seen to rise as the charging current 101 applied to the battery decreases. Eventually a voltage level $V_1$ is reached at which relay 34 is actuated to condition the lighting unit to the low current constant voltage mode, and the battery voltage is thereafter maintained at a constant voltage $V_2$ by a variable charging current which gradually decreases to a low trickle level. Thus, as a result of the constant voltage maintained on line 62 by power supply 30 the charging rate tapers off as battery voltage increases with increasing charge state. This provides recovery for the battery in a minimal time without compromising battery longitivity.

In one commercial embodiment of the invention the flood lamps 13 and 14 of the illumination head and battery 32 are rated at 6 volts. Secondary winding 44 provides 7.5 volts AC, resulting in a voltage of approximately 7 volts on line 52 with a current ranging from 5 to 7 amperes. Secondary winding 45 provides 11 volts AC at 2 amps, resulting in a regulated voltage on line 62 of approximately 6.5 volts at up to 3 amperes. For a lead acid battery, battery capacities up to 100 amperes may be provided up to 12½ hours of illumination in the event of AC power failure. For a nickel-cadmium battery, battery capacities of up to 60 amps may be provided to obtain an illumination period of up to 6½ hours.

By reason of the low voltage head cut-off circuit operation of the lamps is interrupted in the event the charge state of the battery becomes so depleted during operation as to risk permanent damage to the battery. This is done by monitoring the terminal voltage of the battery, and interrupting the connection to the flood lamps in the event of the voltage falling below a minimum level. The provision of a test switch in this circuit provides an efficient means for interrupting operation of the flood lamps in the event of an extended loss of AC voltage when emergency illumination is not required.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. A stand-alone emergency lighting unit operable upon loss of voltage on a monitored AC line, and in conjunction with an external hand-held transmitter unit providing consecutive user-initiated first and second momentary wireless test signals defining a desired test period, comprising:

a housing adapted for mounting on a supporting surface;

illumination means including at least one flood lamp for providing illumination in the vicinity of the housing;

rechargeable battery means in said housing for powering said flood lamp;

rectifier means within said housing operable from the monitored AC line for recharging said battery means, said rectifier means including a supply circuit connected to the monitored AC line;

monitoring circuit means within said housing for monitoring the application of AC line current to said rectifier means and for producing a control effect in the absence thereof;

switch means within said housing responsive to said control effect connecting said battery means to said flood lamp to power said lamp upon loss of voltage on the monitored AC line;

bistable circuit means including detector means within said housing responsive to said consecutive first and second externally generated momentary test signals for interrupting the application of line current to said rectifier means upon receipt of said first momentary test signal whereby said battery is caused to supply current to said illumination means, and for restoring the application of line current to said rectifier means upon receipt of said second momentary test signal whereby the supply of battery current to said illumination means is discontinued, said momentary test signals thereby providing said desired test period; and said bistable circuit means in the absence of said second momentary test signal restoring the application of line current to said rectifier means following a predetermined period of time after said first test signal whereby the supply of battery current to said illumination means is discontinued, said first test signal thereby automatically providing a default test period of finite duration.

* * * * *